US012613972B2

(12) United States Patent
Butchko et al.

(10) Patent No.: US 12,613,972 B2
(45) Date of Patent: *Apr. 28, 2026

(54) FLEXIBLE RISK ASSESSMENT AND MANAGEMENT SYSTEM FOR INTEGRATED RISK AND VALUE ANALYSIS

(71) Applicant: Butchko Inc., Superior, CO (US)

(72) Inventors: Benjamin Michael Butchko, Superior, CO (US); Walter C. Smith, Houston, TX (US)

(73) Assignee: Butchko Inc., Superior, CO (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/113,803

(22) Filed: Feb. 24, 2023

(65) Prior Publication Data

US 2023/0214500 A1    Jul. 6, 2023

Related U.S. Application Data

(63) Continuation of application No. 16/802,156, filed on Feb. 26, 2020, now Pat. No. 11,615,191.

(51) Int. Cl.
| | |
|---|---|
| *G06F 21/57* | (2013.01) |
| *G06F 17/18* | (2006.01) |
| *G06F 30/20* | (2020.01) |
| *G06N 7/01* | (2023.01) |

(52) U.S. Cl.
CPC ............ *G06F 21/577* (2013.01); *G06F 17/18* (2013.01); *G06F 30/20* (2020.01); *G06N 7/01* (2023.01); *G06F 2221/034* (2013.01)

(58) Field of Classification Search
CPC ........ G06F 21/577; G06F 17/18; G06F 30/20; G06F 2221/034; G06N 7/01; H04L 63/1433
See application file for complete search history.

(56) References Cited

U.S. PATENT DOCUMENTS

| | | | | |
|---|---|---|---|---|
| 9,537,884 | B1 * | 1/2017 | Raugas | ............... H04L 63/1433 |
| 10,469,521 | B1 * | 11/2019 | Segal | ................. H04L 63/1433 |
| 10,594,723 | B2 * | 3/2020 | Geil | ................. G06F 16/24578 |
| 10,630,641 | B2 * | 4/2020 | Leach | ................ H04L 61/5092 |
| 10,637,883 | B1 * | 4/2020 | Segal | ................. H04L 63/1433 |
| 11,494,486 | B1 * | 11/2022 | Kim | ...................... G06N 3/045 |

(Continued)

*Primary Examiner* — Meng Li

(74) *Attorney, Agent, or Firm* — Blank Rome LLP

(57) ABSTRACT

Providing a risk analysis report for an undesired event includes receiving a request comprising undesired event data defining an undesired event, wherein the undesired event data corresponds to an asset, identifying, from an attack database, one or more sets of attack attributes related to the undesired event data, and identifying one or more protection measures relevant to the asset and the attack attributes. The technique also includes performing a first set of Monte Carlo simulations for the undesired event based on combinations of the attack attributes, the protection measures, and the asset, and performing a second set of Monte Carlo simulations for the undesired event based on a subset of the combinations of the attack attribute. One or more combinations of the attack attributes, the protection measures, and the asset which result in the undesired event are provided in accordance with outcomes.

17 Claims, 10 Drawing Sheets

(56) References Cited

U.S. PATENT DOCUMENTS

| | | | |
|---|---|---|---|
| 2004/0103205 A1* | 5/2004 | Larson | H04L 63/1458 |
| | | | 709/229 |
| 2007/0283007 A1* | 12/2007 | Keir | H04L 41/12 |
| | | | 709/224 |
| 2008/0098479 A1* | 4/2008 | O'Rourke | H04L 63/1433 |
| | | | 726/25 |
| 2014/0283099 A1* | 9/2014 | Smith | G06F 11/00 |
| | | | 726/26 |
| 2015/0088783 A1* | 3/2015 | Mun | G06Q 40/02 |
| | | | 705/36 R |
| 2015/0381649 A1* | 12/2015 | Schultz | G06Q 10/0635 |
| | | | 726/25 |
| 2016/0197953 A1* | 7/2016 | King-Wilson | G06Q 40/08 |
| | | | 726/25 |
| 2016/0294793 A1* | 10/2016 | Larson | H04L 63/1408 |
| 2017/0026338 A1* | 1/2017 | Leach | H04L 63/02 |
| 2017/0366572 A1* | 12/2017 | King-Wilson | H04L 63/1433 |
| 2018/0365429 A1* | 12/2018 | Segal | H04L 67/535 |
| 2019/0068631 A1* | 2/2019 | Ashkenazy | H04L 41/22 |
| 2019/0316902 A1* | 10/2019 | Sparago | G06F 17/18 |
| 2020/0053111 A1* | 2/2020 | Jakobsson | H04L 63/1416 |
| 2020/0280577 A1* | 9/2020 | Segal | H04L 63/20 |
| 2021/0021636 A1* | 1/2021 | Sbandi | H04L 63/1466 |
| 2021/0142424 A1* | 5/2021 | Dinh | G06Q 10/10 |
| 2021/0248240 A1* | 8/2021 | Comish | G06F 21/577 |
| 2021/0264038 A1* | 8/2021 | Butchko | H04L 63/1433 |
| 2023/0214500 A1* | 7/2023 | Butchko | G06F 17/18 |
| | | | 726/25 |

* cited by examiner

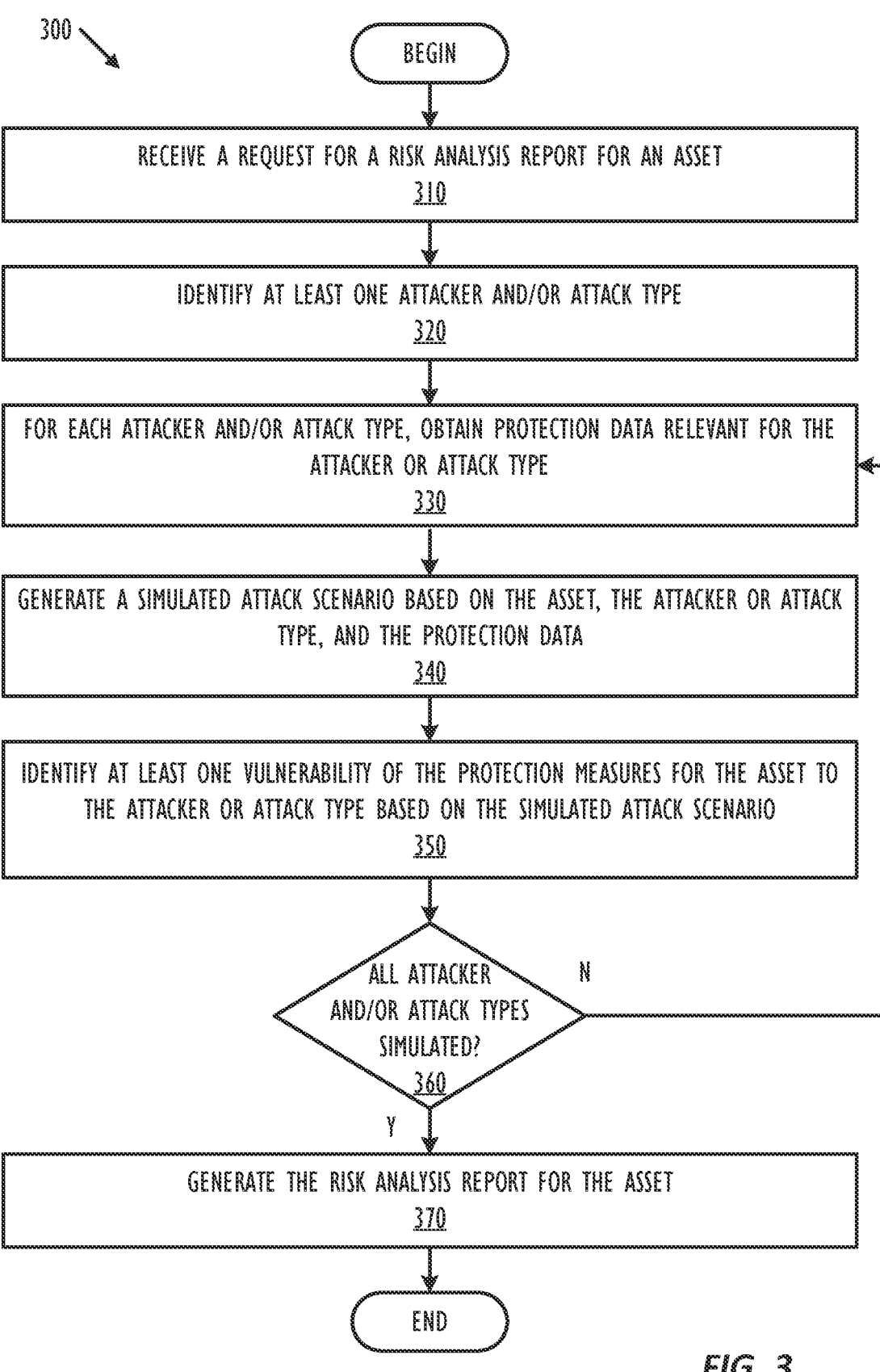

300

BEGIN

RECEIVE A REQUEST FOR A RISK ANALYSIS REPORT FOR AN ASSET
310

IDENTIFY AT LEAST ONE ATTACKER AND/OR ATTACK TYPE
320

FOR EACH ATTACKER AND/OR ATTACK TYPE, OBTAIN PROTECTION DATA RELEVANT FOR THE ATTACKER OR ATTACK TYPE
330

GENERATE A SIMULATED ATTACK SCENARIO BASED ON THE ASSET, THE ATTACKER OR ATTACK TYPE, AND THE PROTECTION DATA
340

IDENTIFY AT LEAST ONE VULNERABILITY OF THE PROTECTION MEASURES FOR THE ASSET TO THE ATTACKER OR ATTACK TYPE BASED ON THE SIMULATED ATTACK SCENARIO
350

ALL ATTACKER AND/OR ATTACK TYPES SIMULATED?
360

N

Y

GENERATE THE RISK ANALYSIS REPORT FOR THE ASSET
370

END

USER
INTERFACE
1040

COMM'N
CIRCUITRY
1060

PROCESSOR
1010

DISPLAY
1050

1070

MEMORY
1020

STORAGE
1030

FLEXIBLE RISK ASSESSMENT AND MANAGEMENT SYSTEM FOR INTEGRATED RISK AND VALUE ANALYSIS

BACKGROUND

Risk assessment and analysis systems have become necessary in a multitude of industries to defend against cyberattacks, theft, sabotage, natural disasters, and the like. Risk analysis and management may be an expensive and time-consuming process though. Many types of security assessments require a subject matter expert to conduct an expensive, time-consuming, and detailed review of every aspect of a business and provide a high quality qualitative rating for a variety of security features. Qualitative ratings often result in range compression due to assessor fatigue, calculation error expansion, assumptions regarding the independence of each feature from other security features and the regularity of rating intervals, and the like. Without industry standard definitions and rating systems for security features and risk, a particular subject matter expert may determine a higher risk for the business than that of a different subject matter expert, or from the same subject matter expert in a subsequent assessment. Quantitative security assessments require extensive modeling and highly detailed data up-front to obtain even preliminary results. These quantitative security assessment systems often require extensive training to input and manage the volumes of highly detailed data about the business's assets and systems.

The upfront cost in time, money, and information needed for qualitative and quantitative risk analysis reports prevent businesses from obtaining them frequently, if the businesses are able to obtain them at all. Businesses that do obtain risk analysis reports often find the reports include over normalized data, losing significant important detail, and inappropriate comparisons between different types of security features and risk. Many risk analysis reports reduce risk to a likelihood and consequence, often shown as a risk matrix, or generalize outputs into a high, medium, or low "risk level," which obscures the larger business impact of the risk. Some risk analysis reports recommend extensive mitigation strategies without consideration of the corresponding business cost or negative impact to primary business processes, both in the initial and ongoing implementation of the mitigation strategies. Thus, what is needed is an improved risk analysis and management system capable of standardizing qualitative assessments, decreasing the amount of initial data input needed to perform assessments, and providing contextualized recommendations for mitigation strategies.

SUMMARY

In one embodiment, a non-transitory computer-readable medium comprising instructions to generate a risk analysis report is described. The instructions include instructions to cause one or more processors to receive a request for a risk analysis report for an undesired event; identify, from a predefined attack database, at least one attack type able to cause the undesired event and for each attack type, at least one requirement for a successful attack; for each of the at least one attack type, obtain protection data associated with protection measures that affect the at least one requirement for a successful attack; for each simulation in a plurality of Monte Carlo simulations for the attack type, perform the simulation a number N of times based on the undesired event, the attack type, and the protection data; determine whether the N performances indicate at least one wildcard;

in response to a determination that the N performances indicate at least one wildcard, perform the simulation an additional N times; identify, based on the performances of the plurality of Monte Carlo simulations, at least one vulnerability of the protection measures to the attack type; and generate the risk analysis report for the undesired event based on the at least one attack type and the at least one vulnerability.

In another embodiment, the non-transitory computer readable medium may be implemented in an electronic device. In yet another embodiment, the instructions comprising the non-transitory computer readable medium may be embodied in a method.

BRIEF DESCRIPTION OF THE DRAWINGS

FIG. 3 shows, in flow chart form, an example method for assessing risk, according to one or more embodiments.

DETAILED DESCRIPTION

Figure 1A:
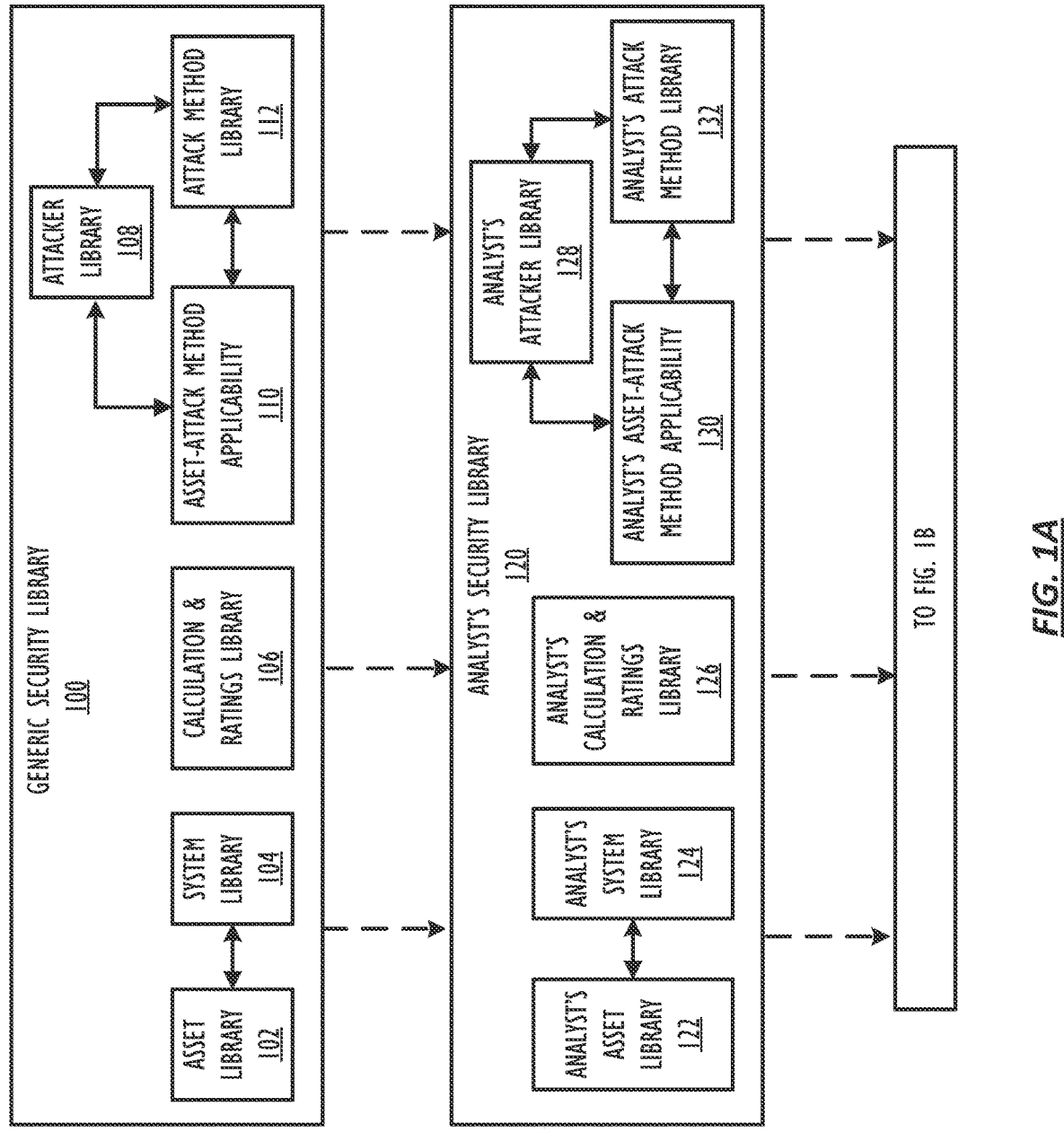
FIGS. 1A-B show a template library architecture for a risk assessment and management system with publisher, analyst, client, and project-specific context, according to one or more embodiments.

The current disclosure is related to systems, methods, and computer readable media for providing risk analysis reports. In general, techniques are disclosed to improve risk analysis, mitigation recommendations, and reporting on risk analysis. According to one or more embodiments, improved risk analysis, mitigation recommendations, and reporting may allow a user to obtain a more relevant risk assessment.

According to one or more embodiments, a risk analysis and assessment system receives a request for a risk analysis report for an asset or an undesired event. The system identifies at least one attack type based on an asset type for the asset and for each attack type, the system obtains protection data relevant for the attack type. The protection data is associated with protection measures for the asset. The system generates a simulated attack scenario based on the asset, the attack type, and the protection data, and identifies at least one vulnerability of the protection measures for the asset to the attack type based on the simulated attack scenario. Interchangeable and customizable calculation and ratings models are applied against contextualized attributes and characteristics of assets, attackers, harm methods, and protection measures. Uncertainty due to randomness and chance are modeled to a user-specified degree, and attackers and/or defender actions can be influenced by contextually accurate perception or knowledge limitations. The system generates the risk analysis report for the asset based on the at least one attack type and the at least one vulnerability. Thus, the resulting risk analysis report may be more relevant for the user.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*).

Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram.

The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Figure 1B:
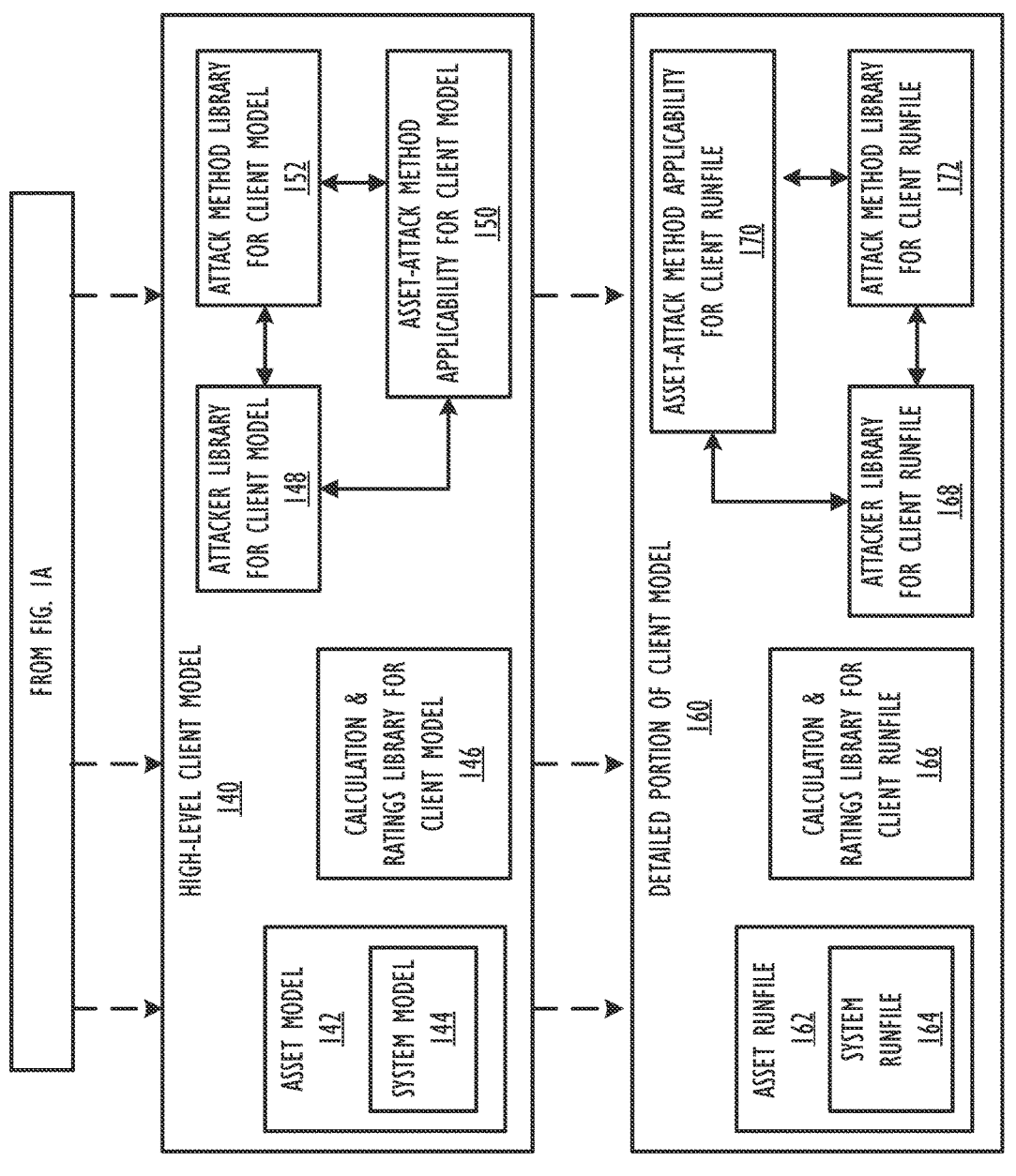

FIGS. 1A-B show a template library architecture for a risk analysis and assessment (RAA) system, according to one or more embodiments. The template library architecture includes a generic security library 100 and an analyst's security library 120, shown in FIG. 1A, and a high-level client model 140 and a detailed portion of a client model 160, shown in FIG. 1B. The generic security library 100 and the analyst's security library 120 are data structures, and the high-level client model 140 and the detailed portion of a client model 160 are instances of the data structures in the generic security library 100 and the analyst's security library 120.

In FIG. 1A, the generic security library 100 includes an asset library 102, a system library 104, a calculation and ratings library 106, an attacker library 108, an attack method library 112, and an asset-attack method applicability library 110. The generic security library 100 does not include details specific to industry or organization, according to one or more embodiments. The asset library 102 may include generic asset types and associated characteristics of the asset types such as inherent value, asset role and role value, location, asset robustness, asset resiliency, and the like. For example, the asset library 102 includes asset types for product inventory, raw materials, data, equipment, employees, and the like. The product inventory asset type is associated with inherent value and location, while the raw materials asset type is associated with a manufacturing role and the value of that manufacturing role to the end product, as well as an availability characteristic representing how easy or difficult it is to obtain or replace the raw materials.

The system library 104 may include generic system types and associated characteristics of the system types. For example, the system library 104 includes generic system types for a manufacturing plant, an administrative building, a research and development facility, a supervisory control and data acquisition (SCADA) system, and the like. The administrative building is associated with an office space characteristic and an employee asset type. The research and development facility is associated with a laboratory space characteristic, an intellectual property development process type, an employee asset type, and a data asset type.

The attacker library 108 may include generic attacker types and associated characteristics and attributes of the attacker types. For example, the attacker library 108 includes generic attacker types for a violent criminal, a state-sponsored computer hacker, a weather hazard, an external regulatory body, and the like. The violent criminal is associated with a preferred weapon type. The state-sponsored computer hacker is associated with a particular ideological goal associated with the state sponsor and server resources available to the hacker.

The attack method library 112 may include generic attack types and, in some embodiments, associated requirements for a successful attack. A generic attack type represents a security threat causing harm to an asset or system, and the associated requirements for a successful attack represent steps to be performed or necessary resources included in an attack on the asset or system that successfully achieves the intended harm. For example, the attack method library 112 includes attack types for arson, theft, hijacking, malware, and destruction. The arson attack type is associated with a fuel requirement and an ignition requirement. The malware attack type is associated with a malware requirement, an infection mechanism requirement, and a concealment requirement.

In some embodiments, each attack type includes one or more actions for the attack type. An action represents a step to be performed in an attack of the attack type. For example, the arson attack type includes actions for obtaining fuel and an ignition mechanism, accessing the asset, arranging the fuel and the asset, and igniting the fuel and the asset. In some examples, the actions for the attack type may include optional actions, such as disabling fire alarms or sprinkler systems in the arson example. The asset-attack method applicability library 110 indicates which attack types in attack method library 112 and which attackers in attacker library 108 are relevant to which asset types in asset library 102 and system library 104. For example, the theft attack type is relevant to the product inventory asset type, and the destruction attack type is relevant to the product inventory asset type and the equipment asset type.

In some embodiments, the asset library 102, the system library 104, the attacker library 108, the attack method library 112, and the asset-attack method applicability library 110 in generic security library 100 may be generated using a machine learning algorithm which models decisions made by subject matter experts in qualitative decisions and assessments of protection measures, vulnerabilities, mitigation strategies, and the like. In some embodiments, the machine learning algorithm may be based on the Brunswik Lens model of probabilistic functionalism. The qualitative decisions and assessments may be stored with the corresponding context data, such that instances drawn from the attack type may update context data with the appropriate context for the instance.

The calculation and ratings library 106 may include different calculation types and ratings frameworks to direct how the risk assessment system analyzes system elements. In some embodiments, multiple different rating and/or calculation models may be used on the same datasets in order to facilitate analysis and reporting aligned with organizationally accepted models, terms, and interpretations.

The analyst's security library 120 includes an analyst's asset library 122, an analyst's system library 124, an analyst's calculation and ratings library 126, an analyst's attacker library 128, an analyst's attack method library 132, and an analyst's asset-attack method applicability library 130. The analyst's security library 120 may use types of assets, systems, attackers, and attacks from generic security library 100 as templates, modified to be specific to a particular type of risk, type of system, industry, or any combination thereof. Similarly, the analyst's calculation and ratings library 126 may include a subset of the calculation types and ratings frameworks in calculation and ratings library 106 that are commonly used to analyze the particular type of risk, type of system, industry, or any combination thereof.

A particular type of risk represents a risk specific to particular kinds of assets or systems. For example, physical security is a type of risk specific to employees, buildings, and the like, while cybersecurity is a type of risk specific to computer networks, databases, server farms, and the like. A particular type of system represents a system with particular characteristics and vulnerabilities. For example, a manufacturing control system and a server farm are types of systems. A particular industry represents characteristics and vulnerabilities corresponding to the industry. For example, the financial industry may be vulnerable to cyberattacks but resilient to supply-chain disruption, while the manufacturing industry may be resilient to cyberattacks but vulnerable to supply-chain disruption.

To illustrate an example of a petrochemical analyst's security library 120 based on templates from generic security library 100, a petrochemical analyst's asset library 122 may include data structures for types of specific assets typically utilized within the petrochemical industry, such as storage tanks and component chemicals. The petrochemical analyst's system library 124 may include data structures for types of systems and processes used in the petrochemical industry, such as petrochemical processing plants. Similarly, the analyst's attacker library 128 may include data structures for types of attackers that commonly attack businesses in the petrochemical industry, such as regulatory agencies that enforce penalties for noncompliance with safety regulations, natural disasters that damage a petrochemical supply line, and the like. The analyst's asset-attack method applicability library 130 indicates which attack types in attack method library 132 and which attackers in attacker library 128 threaten which asset types in asset library 122 and system library 124. For example, the storage tank asset type is associated with the natural disasters attacker type, while a component chemicals asset type is associated with natural disasters attacker type and the regulatory agencies attacker type.

In FIG. 1B, the high-level client model 140 includes an asset model 142 comprising a system model 144, a calculation and ratings library for the client model 146, an attack method library for the client model 152, an attacker library for the client model 148, and an asset-attack method applicability for client model 150. The high-level client model 140 may use assets, systems, attackers, and attacks from generic security library 100 or the analyst's security library 120 as templates, modified to include details specific to a particular organization. Similarly, the calculation and ratings library 146 may include a subset of the calculation types and ratings frameworks in calculation and ratings library 106 and 126 that are used by the particular organization to analyze its risks.

For example, a petrochemical company's system model 144 may include an upstream oil well, a downstream processing plant, and an administrative building, and the petrochemical company's asset model 142 may include a drilling equipment asset type, a well data asset type, and engineering personnel asset type associated with the upstream oil well. Similarly, the attack method library 152 may include attack types relevant to the organization's particular configuration of assets included in asset model 142 and systems included in system model 144. The asset-attack method applicability library 150 for the client model indicates which attack types in attack method library 152 and which attacker types in attacker library 148 threaten which asset types in asset library 142 and system library 144.

The detailed portion of the client model 160 includes an asset runfile 162 comprising a system runfile 164, a calculation and ratings library for the client runfile 166, an attacker library for the client runfile 168, an attack method library for the client runfile 172, and an asset-attack method applicability library for client runfile 170. The asset runfile 162 prompts a processor performing the runfile to look up one or more asset types in the generic asset library 102, the analyst's asset library 122, and/or the high-level client asset model 142 and generate instances of the one or more asset types with added detail specific to the organization from the templates in the generic asset library 102, the analyst's asset library 122, and/or the high-level client asset model 142. The system runfile 164 in the asset runfile 162 prompts a processor performing the runfile to lookup one or more system types in the generic system library 104, the analyst's system library 124, and/or the high-level client system model 144 and generate instances of the one or more system types with added detail specific to the organization from the templates included in the generic system library 104, the analyst's system library 124, and/or the high-level client system model 144.

The detailed portion of the client model 160 may include organization specific instances of the asset, system, attacker, and attack types in the high-level client model 140. The organization specific details for the asset, system, attacker, and attack types in the detailed portion of the client model 160 may be input by a user or imported from a template file. In some embodiments, the user may input the organization specific details via an intuitive graphical user interface, such as a map interface in which the user can arrange assets and systems according to their real-world configuration.

For example, a petrochemical company's system runfile 164 may include an upstream oil well instance associated with a particular location and a particular production rate, corresponding to the company's upstream oil well. The petrochemical company's asset runfile 162 may include a drilling equipment instance associated with a particular well head and pump, corresponding to the drilling equipment the company uses at the upstream oil well. Similarly, the attack method library 172 may include attack types relevant to, that is, threaten, the organization's particular configuration of assets included in asset runfile 162 and systems included in system runfile 164. The asset-attack method applicability library 170 for the client model indicates which attackers in attacker library 168 and which attack types in attack method library 172 are relevant to, that is, threaten, which asset types in asset runfile 162 and system runfile 164.

The generic security library 100 and the analyst's security library 120 allow a user to build a model of an asset or a system without extensive initial data input. Further, the pre-defined libraries allow the user to perform stand-alone analysis for a particular asset or sub-system without building a more complete model of every asset and system in the business. Multiple stand-alone assessments may be combined into an overall system assessment. For example, individual assessments of electrical substations, control centers, and transmission lines may be combined into a full-scope assessment of an electrical grid system that incorporates the appropriate correlations and interdependencies of the individual elements. In addition, the user may perform high-level analysis for a business to identify immediate risks and drill down to further assess individual at-risk sub-systems as needed. For example, a user may assess a petrochemical refinery complex as an initial high-level analysis, identify an at-risk control system, and perform more detailed analysis of the at-risk control system.

Figure 2:
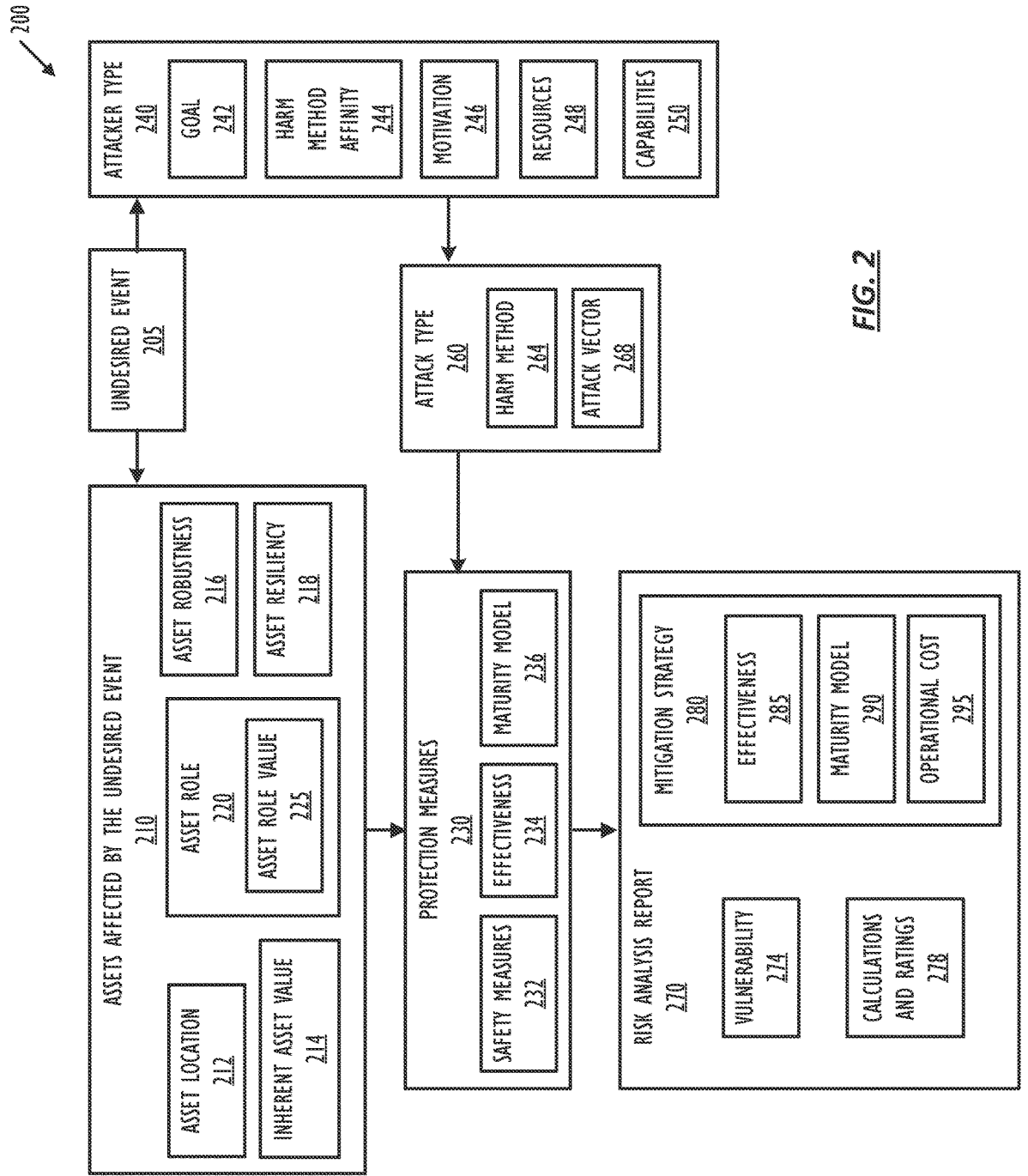
FIG. 2 shows a diagram depicting data flow during a risk assessment, according to one or more embodiments.

FIG. 2 shows a diagram of information flow during a risk assessment, according to one or more embodiments. An undesired event 205 includes data associated with an undesired event, such as an asset or asset type, a value of the asset, an attacker type, and/or an asset attack method which threatens the asset. For example, an undesired event 205 may identify a three-dimensional (3D) printer, the value the 3D printer adds to the business, and the asset harm method of a cyber event causing the 3D printer to be unusable for three days. In another example, an undesired event 205 may identify an attack type of arson and an asset harm of greater than two million dollars. Undesired event 205 may be generated entirely by a user from scratch or based on a story template. Alternatively, in some embodiments a user may generate undesired event 205 based on pre-defined asset types, attacker types, and attack types, customized asset models, attacker types, and attack types specific to the particular asset or business, or both to simplify and quicken the process of generating an undesired event 205.

The pre-defined asset types may be drawn from asset libraries 102 and 122 in generic security library 100 or analyst's security library 120, respectively. The customized asset models may be drawn from asset model 142 in high-level client model 140 or asset runfile 162 in the detailed portion of the client model 160. Similarly, the pre-defined attacker types may be drawn from attacker libraries 108 and 128 in generic security library 100 or analyst's security library 120, respectively. The customized attacker models may be drawn from attacker library for the client model 148 in the high-level client model 140 or attacker library for client runfile 168 in the detailed portion of the client model 160. The pre-defined attack types may be drawn from attack method libraries 112 and 132 in generic security library 100 or analyst's security library 120, respectively. The customized attack types may be drawn from attack method library for client model 152 in high-level client model 140 or attack method library for client runfile 172 in the detailed portion of the client model 160.

Undesired event 205 is used to identify assets 210 that would be affected by the undesired event and, in some embodiments, one or more associated characteristics of the assets. Returning to the arson and harm greater than two million dollars example, the identified assets may include a warehouse holding the business's inventory, a product manufacturing machine that works with highly flammable components, and the like. The associated characteristics of the assets may include asset location 212, inherent asset value 214, what role 220 the asset fills in the business and value 225 that role offers the business, asset robustness 216 which indicates how resistant to attack type 260 the asset 210 is, and asset resiliency 218 which indicates how quickly asset 210 may be repaired, replaced, or otherwise returned to normal operation after an attack of attack type 260. The asset robustness 216 indicates how resistant to attack type 260 the asset 210 is. The asset resiliency 218 indicates how quickly asset 210 may be repaired, replaced, or otherwise returned to normal operation after an attack of attack type 260.

Returning to the 3D printer example, the asset location 212 is a manufacturing plant at a particular address; the inherent value 214 is $X; the role 220 the 3D printer fills in the business is to print components for a product; the value 225 that printing components offers the business is high, in that the products cannot be completed and sold without the components printed by the 3D printer; the asset robustness 216 indicates the 3D printer is moderately resistant to malware attacks; and the asset resiliency 218 indicates the 3D printer is difficult to return to normal operation after a malware attack. In some embodiments, the user provides the identified assets 210 that would be affected by the undesired event and the associated characteristics of the assets and describes redundancy and dependency relationships with other assets in the library model. In some embodiments, the assets 210 that would be affected by the undesired event and the associated characteristics of the asset may be obtained from the generic libraries 100 or 120, the customized asset models runfiles specific to the particular asset or business in high-level client model 140 or detailed portion of client model 160, or both to simplify and quicken the process of identifying assets 210.

Undesired event 205 is also used to identify one or more relevant attacker types 240 and attack types 260 able to accomplish the undesired event and, in some embodiments, characteristics of the attacker type 240 and/or at least one requirement for a successful attack by an attacker type 240 employing the attack type 260. Characteristics of the attacker type 240 may include a goal 242; a threshold motivation 246; a harm method affinity 244 for the harm method 264 in attack type 260; resources 248 available to an attacker type 240; and capabilities 250 of the attacker type 240. The requirements for a successful attack of attack type 260 may include a harm method 264 and an attack vector 268. The harm method 264 indicates a particular method of performing an attack of the attack type. The attack vector 268 indicates the action path upon which the harm method 264 is executed upon the asset 210 of the attack. Returning to the 3D printer example, the attacker type 240 indicates a cyber attacker with the motivation 246 and capabilities 250 to obtain or generate a malware virus capable of disabling the 3D printer and to successfully infect the 3D printer with it. The goal 252 is to damage the printer resulting in the cost to repair or replace the 3D printer and the cost of lost productivity while is 3D printer is inoperable; the motivation 254 indicates a threshold motivation for an attacker to commit the malware attack on the 3D printer, such as a personal grievance against the business or a benefit to the attacker's own business in the absence of competition, and the like; the harm method affinity 244 indicates a particular infection mechanism, such as an infected software update for the 3D printer for which the attacker type 240 has a preference; the resources 248 indicate a malware virus capable of disabling the 3D printer or the resources to obtain one without capabilities constraint; and the capabilities 250 indicate how effectively the attacker can deploy a malware virus capable of disabling the 3D printer and/or the attacker's ability to generate a malware virus without resource constraint. The corresponding attack type 260 is a malware attack designed to disable the 3D printer, the harm method 264 indicates a particular infection mechanism, such as an infected software update for the 3D printer; and the attack vector 268 indicates being the application of the infected software update via plugging an USB device into the printer USB port.

The identified attacker type 240 and attack type 260, with their associated characteristics are used to identify the protection measures 230 in place to protect the assets 210 from the attacker type 240 and attack type 260. In some embodiments, the protection measures 230 include safety measures 232, an effectiveness 234 of the safety measures 232 in protecting the assets 210 from the attack type 260, and a maturity model 236. Returning to the 3D printer example, the safety measures 232 are antivirus and antimalware software defending the 3D printer; the effectiveness 234 represents how effective the antivirus and antimalware safety measures 232 are in protecting the 3D printer from the malware virus in attack type 260; and the maturity model 236 represents the ongoing effectiveness of the antivirus and antimalware software over time. For example, the maturity model 236 may show a decrease in effectiveness of the antivirus and antimalware software over time if the software is not updated regularly or does not update to reflect the evolution of known malware over time.

In some embodiments, the assets 210 and protection measures 230 may also include information regarding the asset owner's perception of the assets 210 and protection measures 230, such as the asset owner's perception of how likely attackers are to target the assets 210, which attacker types 240 are likely to attack the assets 210, what resources and capabilities those attacker types 240 may use, which attack types 260 the attackers are likely to use, how effective the protection measures 230 are in defending against attacks, and the like. Similarly, the attacker type 240 may also include information regarding an attacker's perception of the assets 210 and protection measures 230, such as the attacker's perception of their own resources and abilities, what vulnerabilities the protection measures 230 have, what attack vectors are possible for a particular attack type 260 against the assets 210, and the like. In this way, discrepancies between the asset owner's perception and reality or between the attacker's perception and reality may be considered in the risk analysis.

A risk analysis report 270 is generated within the context of the calculation and rating model 278 based on the undesired event 205, assets 210 that would be affected by the undesired event, the attacker type 240, the attack type 260, and the protection measures 230. In some embodiments, the risk analysis report 270 may include a vulnerability rating 274 for the assets 210 and protection measures 230 to the attacker type 240 and attack type 260 and, in some embodiments, a mitigation strategy 280 to counter the attacker type 240 and attack type 260 or reduce the harm to the assets 210 by the attack type 260. The mitigation strategy 280 may include an effectiveness 285, a maturity model 290, and an operational cost 295. In embodiments in which the user inputs data for undesired event 205 or assets 210 via a graphical user interface based on a map, the risk analysis report 270 may similarly be presented to the user via the mapping interface. Returning to the example in which the asset is vulnerable to arson and the mitigation strategy is a fire suppression and isolation system, the mapping interface may highlight where in the warehouse particular portions of the fire suppression and isolation system may be placed in relation to the asset and the like. The calculation and ratings model 278 may define the analysis rules, details, datum thresholds, and mathematical functions applied to the datasets in order to generate the risk analysis report 270.

Returning to the 3D printer example, the mitigation strategy 280 may include a different type of antivirus and antimalware software safety measures 232 or more frequent updates to the current software to improve the maturity model 236. The effectiveness 285 indicates how effective the mitigation strategy 280 is in protecting the 3D printer from the malware virus in attack type 260, and maturity model 290 represents the ongoing effectiveness of the mitigation strategy 280 over time. For example, the different type of antivirus and antimalware software may defend against more types of known malware, but require more frequent updates, without which the different type of antivirus and antimalware software is ineffective.

The operational cost 295 represents the business cost of the mitigation strategy 280, such as a cost to implement the different type of antivirus and antimalware software on the 3D printer and a cost of lost productivity while the 3D printer updates more frequently. The operational cost 295 allows a user to determine whether the business cost of the mitigation strategy 280 is acceptable given the vulnerability 274. For example, the vulnerability 274 of an asset is moderate, but the maturity model 290 indicates the effectiveness of mitigation strategy 280 decreases exponentially over time. The operational cost 295 of the mitigation strategy 280 may be unacceptably high for the business given the rapid decrease in effectiveness over time.

Because the 3D printer is moderately resistant to malware attacks and difficult to return to normal operation, the mitigation strategy 280 may prioritize preventing and defending against malware attacks rather than lessening the damage of a successful malware attack. In another example in which the 3D printer is easy and quick to return to normal operation, the mitigation strategy 280 may instead prioritize isolation the malware to prevent it spreading from the 3D printer to other devices on the network, which would dramatically increase the damage and cost of the malware attack.

FIG. 3 shows, in flow chart form, a method 300 for assessing risk. For purposes of explanation, the following steps will be described in the context of FIGS. 1 and 2. The flow chart begins at 310, where a risk analysis and assessment (RAA) system receives a request for a risk analysis report for an asset, such as risk analysis report 270 for assets 210. In some embodiments, the request for a risk analysis report includes undesired event 205 or at least one of an asset type for the asset, an asset location, an asset value, and/or an asset harm method. For example, the asset type may be a business's product inventory, which is stored at a particular warehouse, worth 10% of the business's market capital.

The flow chart continues at 320, where the RAA system identifies at least one attacker and/or attack type based on an asset type for the asset, such as attacker type 240 and attack type 260. For example, product inventory may be stolen or destroyed, but is not susceptible to assault like an employee is. In some embodiments, the RAA system may identify at least one requirement for a successful attack of the attack type. The RAA system may identify attacker types, attack types, and associated characteristics or requirements by obtaining attacker types and/or attack types relevant for the asset type or undesired event from a pre-defined attack database, such as from asset-method applicability database 112. In this manner, the user may control specific elements of an attack, based upon applicability to the asset data included in the request for the risk analysis report for the asset.

At 330, for each attacker and/or attack type identified at 320, the RAA system obtains protection data relevant for the attacker or attack type. The protection data is associated with protection measures for the asset, such as protection measures 230. In some embodiments, the protection data is associated with protection measures that affect the at least one requirement for a successful attack of the attack type. Returning to the product inventory example, the particular identified attack type is theft, and the protection measures for the product inventory include a security guard at the particular warehouse where the inventory is stored and the warehouse's access control system. At 340, the RAA system generates a simulated attack scenario based on the asset, the attacker or attack type, and the protection data. For example, the RAA system generates a simulated attack scenario in which the security guard and the warehouse's access control system are bypassed by an attacker with a forged access badge and the product inventory is stolen.

At 350, the RAA system identifies at least one vulnerability of the protection measures for the asset to the attack type based on the simulated attack scenario. For example, the warehouse's access control system is vulnerable to forged access badges. At 360, the RAA system determines whether all of the attacker and/or attack types identified at 320 have been simulated. If not, the RAA system repeats steps 330-350 for the remaining attacker and/or attack types, such as for the destruction of the product inventory. Once all of the attacker and/or attack types identified at 320 have been simulated, the RAA system generates the risk analysis report for the asset at 370. In some embodiments, the risk analysis report includes a detailed description of the simulated attack scenario, including significant events, actions, decisions and outcomes affecting successful completion of the attack.

In some embodiments, the RAA system is a computer performing the risk analysis and assessment locally. In other embodiments, the RAA system includes a local, client computer and a remote server in communication. Some steps of method 300 may be performed remotely by the server and the results provided to the local, client computer. In some embodiments, the software to perform method 300 is licensed on a subscription basis, and the remote service acts as a central host for the software. In some embodiments, method 300 may be performed as a real-time analysis as part of a command and control function, a computer-aided dispatch system, and the like. Real-time information such as weather feeds, the United States Department of State travel advisories, the real-time location of security guards, and the like may be incorporated into the simulated attack scenario.

Figure 4:
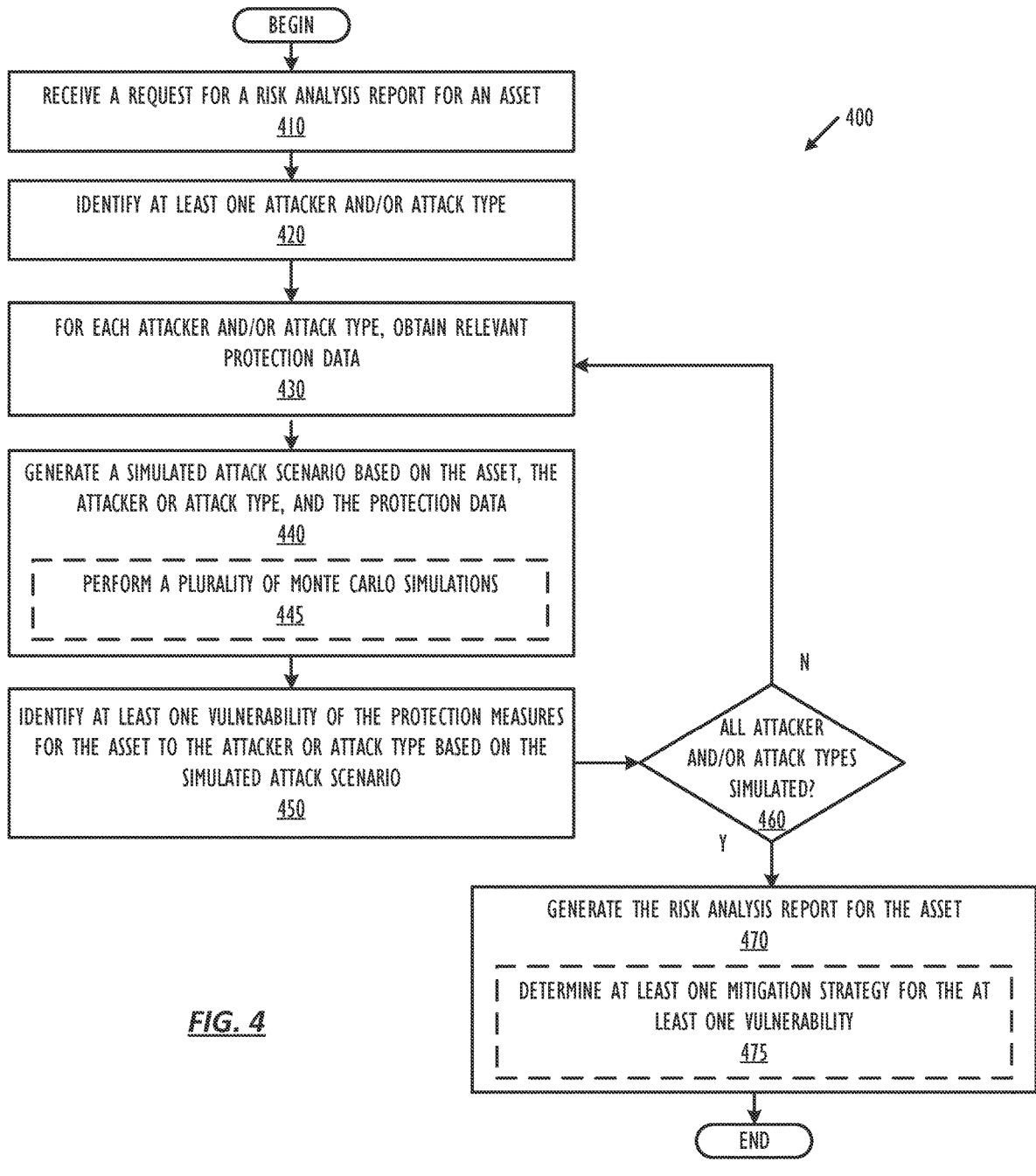
FIG. 4 shows, in flow chart form, a further example method for assessing risk, according to one or more embodiments.

FIG. 4 shows, in flow chart form, a method 400 for assessing risk, according to one or more embodiments. In one or more embodiments, certain actions take place as part of generating a simulated attack scenario and generating the risk analysis report. For purposes of explanation, the following steps will be described in the context of FIG. 3. Steps 410-430 of process 400 are similar to steps 310-330 of process 300 shown in FIG. 3. At 440, the RAA system generates a simulated attack scenario based on the asset, the attacker or attack type, and the protection data from steps 410, 420, and 430. Generating a simulated attack scenario may optionally further comprise step 445, at which the RAA system performs a plurality of Monte Carlo simulations of the attack scenario to model different ways the attack type may be conducted or the different attacks the attacker type may use against the asset.

Returning to the product inventory example, the RAA system performs a first Monte Carlo simulation in which the security guard and the warehouse's access control system are bypassed by an attacker with a forged access badge and the product inventory is stolen; a second Monte Carlo simulation in which the security guard is incapacitated, the guard's credentials are used to bypass the warehouse's access control system, and the production inventory is stolen; and a third Monte Carlo simulation in which the warehouse's access control system is overwhelmed by an alert at every access point, the security guard is distracted responding to each false alert, and the product inventory is stolen. The number of Monte Carlo simulations in the plurality performed may be determined based on the number of ways the attack type may be performed and/or the number of different attacks of which the attacker type is capable. The simulated attack scenario results are based on the plurality of Monte Carlo simulations.

Steps 450 and 460 are similar to steps 350 and 360 of process 300 shown in FIG. 3. At 470, the RAA system generates the risk analysis report for the asset, which may optionally further comprise step 475. At step 475, the RAA system determines at least one mitigation strategy for the at least one vulnerability. For example, the RAA system may determine an appropriate mitigation strategy for forged access badges is to upgrade the warehouse access control system with two-factor authentication. In some embodiments, the RAA system may use a machine learning algorithm to model decisions made by subject matter experts in qualitative assessments of protection measures, vulnerability identifications, recommendations for appropriate mitigation strategies and the like. In some embodiments, the machine learning algorithm may be based on the Brunswik Lens model of probabilistic function. After initial training, known data may be injected into the current analysis to verify that the machine learning algorithm outputs decisions and ratings corresponding to those made by subject matter experts.

In some embodiments, the RAA system may implement qualitative assessments in response to a user request; for features that cannot be or cannot practically be quantitatively measured; for risk analysis reports in which low-accuracy answers are acceptable, such as for determining a quick, economical prioritization order for assets groups most at risk; and for operations in which inaccuracies can be isolated and minimized or otherwise factored out of later operations, for example in sorting assets by rough order of magnitude replacement value and applying the same decision tool with the same error to each asset in the group. The number of data transformations performed on approximated data sets are reduced as much as possible, in order to reduce error multiplication and propagation. Instead of transformations, approximated data sets are grouped by relevant sorting variables and pairwise ranked, before further transformations are applied to selected data above or below thresholds, or within ranges, corresponding to the relevant sorting variables. Users may set the thresholds or ranges based on the particular variable of interest or use default thresholds or ranges included in the calculations and ratings models. For example, assets may be sorted by value, and further data transformations performed on assets valued above ten million dollars. Datum outside the selected data are retained for subsequent computation and analysis. Error introduced during the approximation process is thus confined within the current context only, and biases may be compensated for during the pairwise sort. Later data transformations do not propagate errors to, commingle with, or dilute the accuracy of later calculated values.

Figure 5:
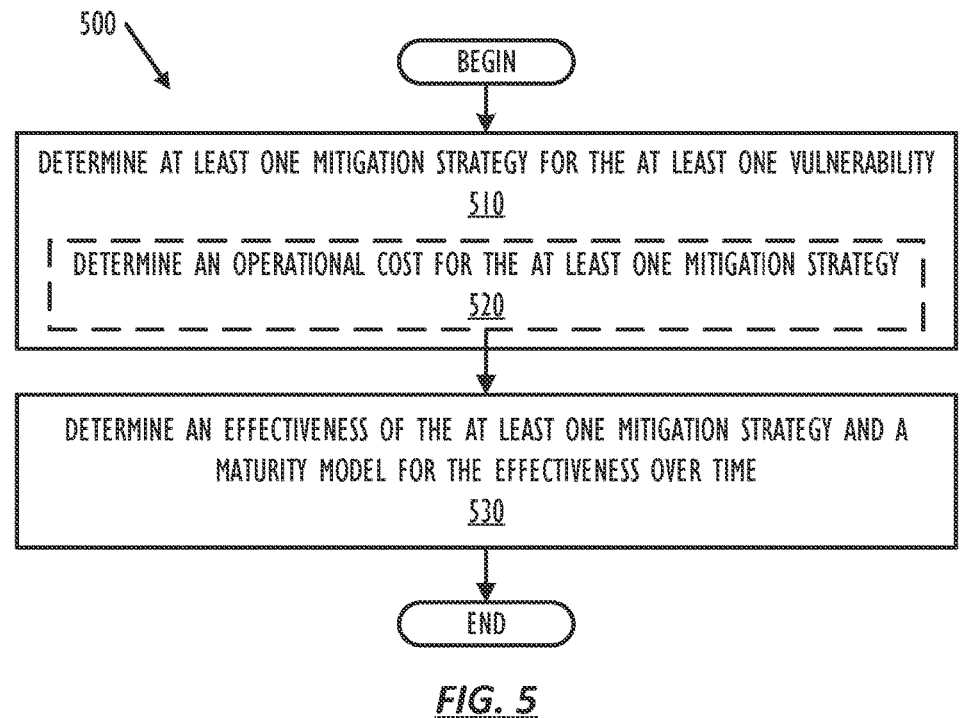
FIG. 5 shows, in flow chart form, an example method for generating a risk analysis report, according to one or more embodiments.

FIG. 5 shows, in flow chart form, an example method 500 for generating a risk analysis report such as in step 470 of process 400 shown in FIG. 4, according to one or more embodiments. In one or more embodiments, certain actions take place as part of determining at least one mitigation strategy. Still other actions comprise additional functionality. For purposes of explanation, the following steps will be described in the context of FIG. 4. At 510, the RAA system determines at least one mitigation strategy for at least one vulnerability, such as the at least one vulnerability determined at step 450 of process 400 shown in FIG. 4.

Determining at least one mitigation strategy may optionally further comprise step 520, at which the RAA system determines an operational cost for the at least one mitigation strategy. For example, where the asset is vulnerable to arson and the mitigation strategy is a fire suppression and isolation system, the operational cost to implement the system may include the cost to install and maintain the system, the cost of moving the product inventory to another warehouse while the system is installed, and the like. At 530, the RAA system determines an effectiveness of the at least one mitigation strategy and a maturity model for the effectiveness over time. Returning to the example of the vulnerability to forged access badges and the mitigation strategy to upgrade the warehouse access control system with two-factor authentication, the RAA system may determine that two-factor authentication is 80% effective and that the maturity model for the effectiveness over time indicates a minor reduction in effectiveness over time to 75% effective.

Figure 6:
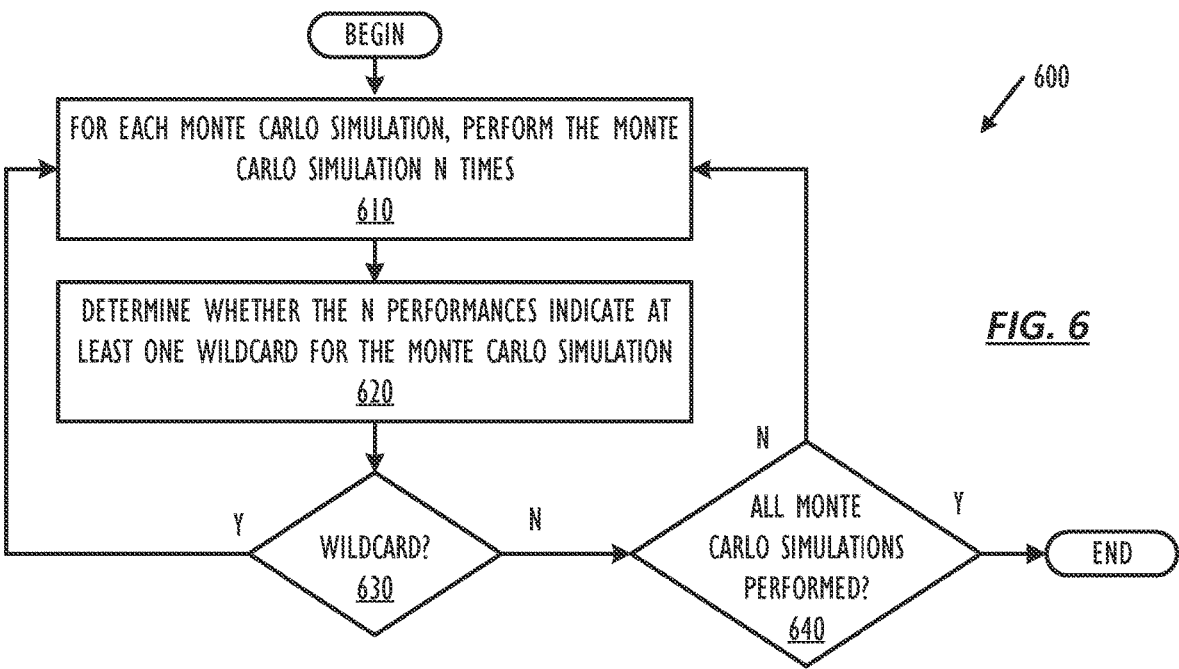
FIG. 6 shows, in flow chart form, an example method for performing a plurality of Monte Carlo simulations in a risk assessment, according to one or more embodiments.

FIG. 6 shows, in flow chart form, an example method 600 for performing a plurality of Monte Carlo simulations for a simulated attack scenario such as in step 445 of process 400 shown in FIG. 4, according to one or more embodiments. For purposes of explanation, the following steps will be described in the context of FIG. 4. At 610, for each Monte Carlo simulation in the plurality of Monte Carlo simulations, the RAA system performs the Monte Carlo simulation a predetermined number N of times. By performing each Monte Carlo simulation multiple times, the RAA system accounts for variables of uncertainty and randomness, such as how attackers react and adapt to variations in the attack conditions, the dynamics of real-time decisions, and interactions between the attackers and the protection measures. At 620, the RAA system determines whether the N performances of the Monte Carlo simulation indicate at least one wildcard for the Monte Carlo simulation. A wildcard indicates a particular variable of uncertainty and randomness with a disproportionate effect on the outcome of the Monte Carlo simulation.

For example, the outcome of a Monte Carlo simulation for the simulated attack scenario in which the security guard and the warehouse's access control system are bypassed by an attacker with a forged access badge and the product inventory is stolen may vary based on the location of the security guard in his patrol and the corresponding response time. The location of the security guard is identified as a wildcard that may influence the success of an attack of that type. In some embodiments, the at least one vulnerability of the protection measures to the attack type is further identified based on the wildcards. In response to determining the N performances of the Monte Carlo simulation for the simulated attack scenario indicate a wildcard at 630, the RAA system returns to step 610 and performs the Monte Carlo simulation an additional N times.

In response to determining the N performances of the Monte Carlo simulation do not indicate a wildcard, the RAA system determines whether all of the Monte Carlo simulations in the plurality of Monte Carlo simulations have been performed at 640. If not, the RAA system repeats steps 610-630 for the remaining Monte Carlo simulations. Once all of the Monte Carlo simulations have been performed, the RAA system has finished performing the plurality of Monte Carlo simulations for the simulated attack scenario in step 445 of process 400 shown in FIG. 4 and may proceed to step 450 and identify at least one vulnerability of the protection measures based on the simulated attack scenario, the performances of the plurality of Monte Carlo simulations, and any wildcards indicated by the performances.

Figures 7, 9:
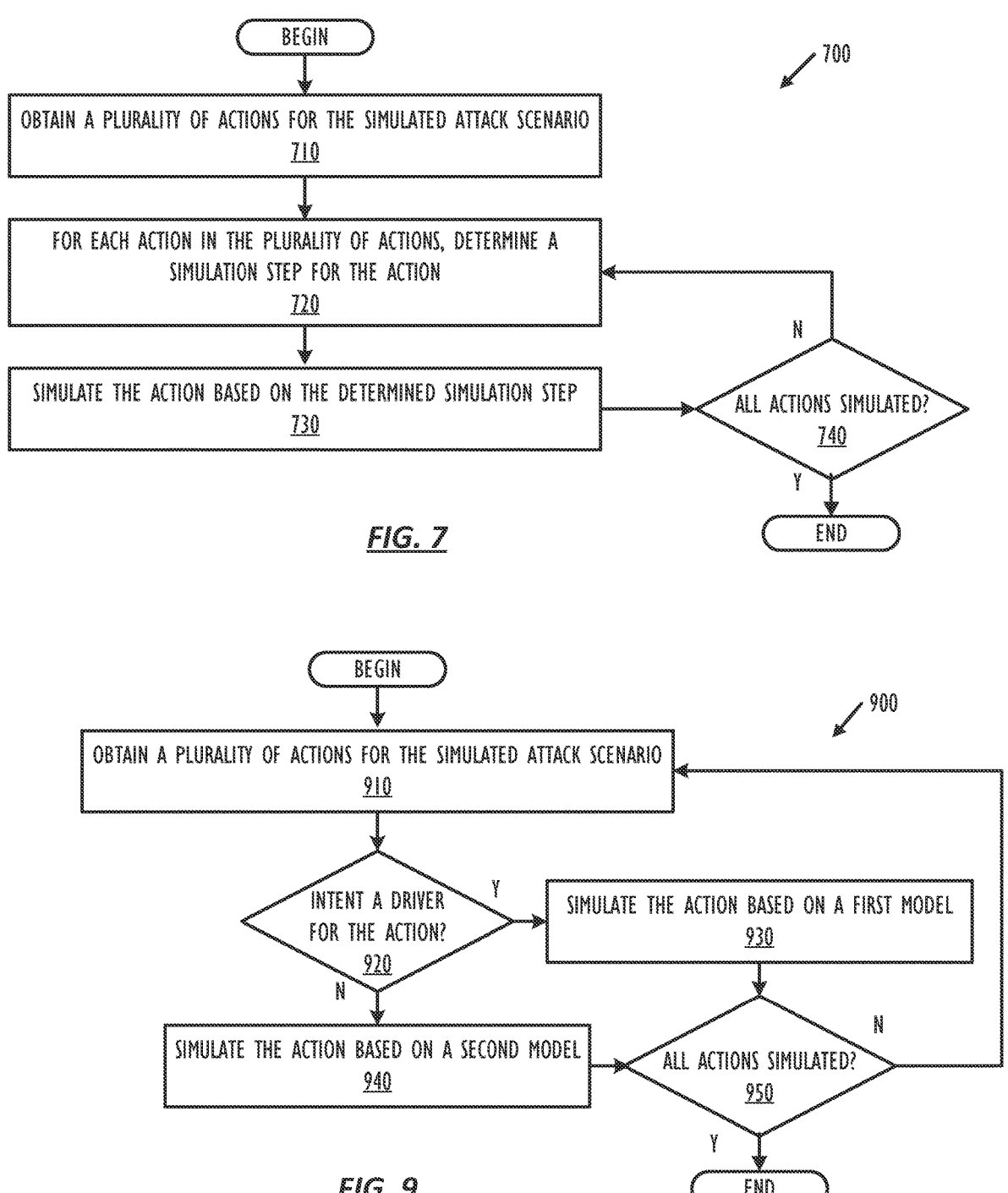
FIG. 7 shows, in flow chart form, an example method for generating a simulated attack scenario in a risk assessment, according to one or more embodiments.
FIG. 9 shows, in flow chart form, a further example method for generating a simulated attack scenario in a risk assessment, according to one or more embodiments.

FIG. 7 shows, in flow chart form, an example method 700 for generating a simulated attack scenario such as in step 340 of process 300 shown in FIG. 3, according to one or more embodiments. At 710, the RAA system obtains a plurality of actions for the simulated attack scenario. Returning to the example in which the security guard and the warehouse's access control system are bypassed by an attacker with a forged access badge and the product inventory is stolen, the plurality of actions may include forging the access badge, breaking into the warehouse, moving the product inventory to a getaway vehicle, and escaping with the product inventory. For each action in the plurality of actions, the RAA system determines a simulation step for the action at 720. For example, the simulation step may be state-based or a time increment.

At 730, the RAA system simulates the action based on the determined simulation step. The RAA system determines whether all of the actions in the plurality of actions are simulated at 740. If not, the RAA system repeats steps 720-730 for the remaining actions. Once all the actions in the plurality of actions are simulated, the RAA system has finished generating the simulated attack scenario in step 340 of process 300 shown in FIG. 3 and may proceed to step 350 and identify at least one vulnerability of the protection measures based on the simulated attack scenario.

Figure 8:
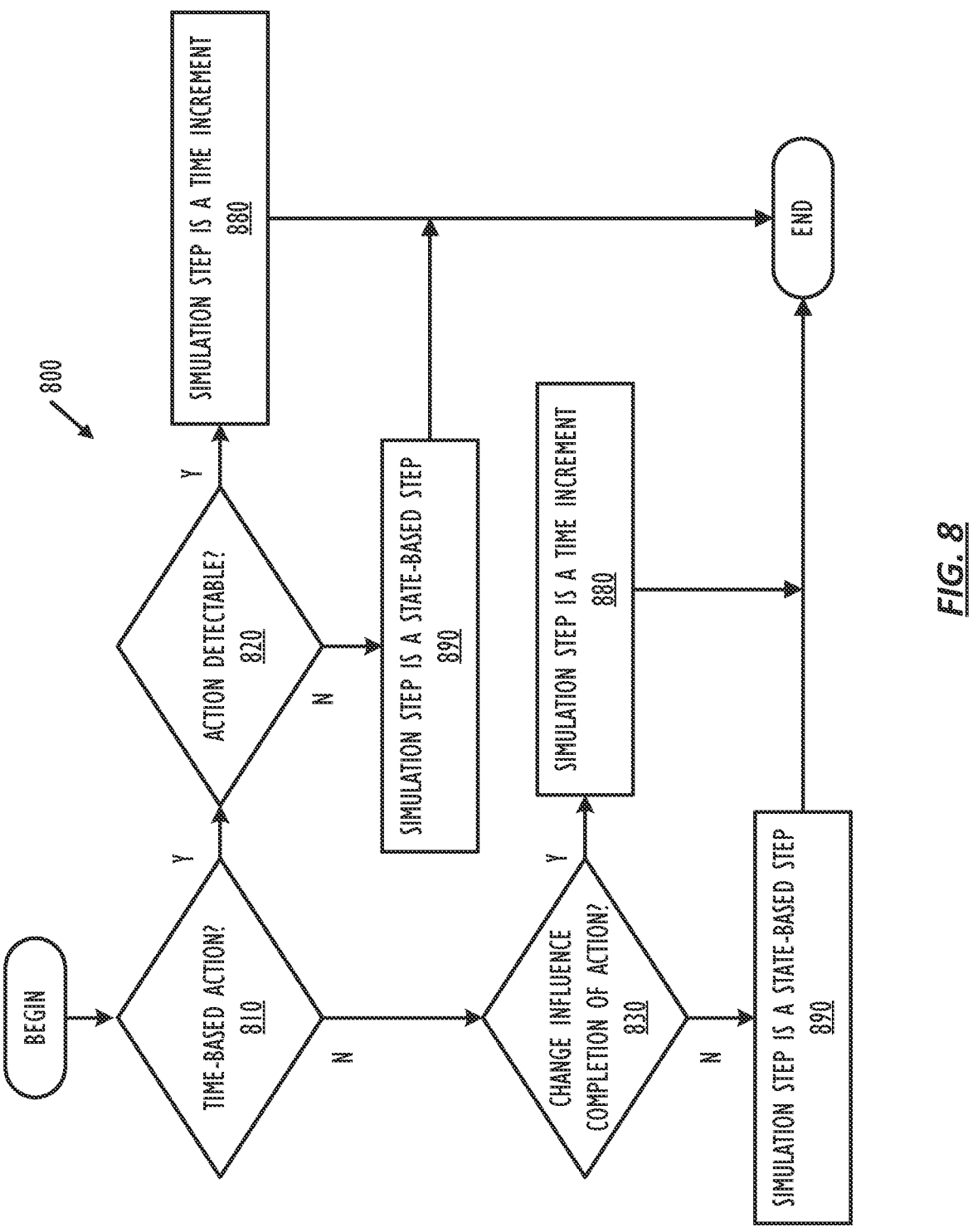
FIG. 8 shows, in flow chart form, an example method for determining a simulation step during generation of a simulated attack scenario in a risk assessment, according to one or more embodiments.

FIG. 8 shows, in flow chart form, an example method for determining a simulation step for an action in a simulated attack scenario such as in step 720 of process 700 shown in FIG. 7, according to one or more embodiments. At 810, the RAA system determines whether the action is a time-based action. In response to determining the action is a time-based action, the RAA system determines whether the action is detectable at 820. For example, a forged access badge does not trigger an alert in the warehouse access system and is not detectable. If the action is detectable, the RAA system determines the simulation step is a time increment at 880. If the action is not detectable, the RAA system determines the simulation step is a state-based step at 890. The RAA system has finished determining the simulation step for the action in step 720 and may proceed to step 730 and simulate the action using the determined simulation step.

In response to determining the action is not time-based, the RAA system determines whether a change in the context of the simulated attack scenario may influence completion of the action at 830. For example, an interaction between the attacker and the security guard may prevent the attacker from moving the product inventory to the getaway vehicle. If a change in the context may influence completion of the action, the RAA system determines the simulation step is a time increment at 880. If a change in the context does not influence completion of the action, the RAA system determines the simulation step is a state-based step at 890. Then, the RAA system has finished determining the simulation step for the action in step 720 and may proceed to step 730 and simulate the action using the determined simulation step.

FIG. 9 shows, in flow chart form, a further example method 900 for generating a simulated attack scenario in a risk assessment such as in step 340 of process 300 shown in FIG. 3, according to one or more embodiments. At 910, the RAA system obtains a plurality of actions for the simulated attack scenario and determines whether intent is a driver for the action at 920. For the action of moving the product inventory to a getaway vehicle, the attacker's intent determines the route through the warehouse and how many times the attacker is willing to risk going back and forth to steal more of the product inventory. In response to determining intent is a driver for the action, the RAA system simulates the action based on a first model at 930. In some embodiments, the first model is a Bayesian uncertainty model.

In response to determining intent is not a driver for the action, the RAA system simulates the action based on a second model at 940. In some embodiments, the second model is a Brunswik Lens model of probabilistic function. The RAA system determines whether all of the actions in the plurality of actions are simulated at 950. If not, the RAA system repeats steps 910-940 for the remaining actions. Once all the actions in the plurality of actions are simulated, the RAA system has finished generating the simulated attack scenario in step 340 of process 300 shown in FIG. 3 and may proceed to step 350 and identify at least one vulnerability of the protection measures based on the simulated attack scenario.

Figure 10:
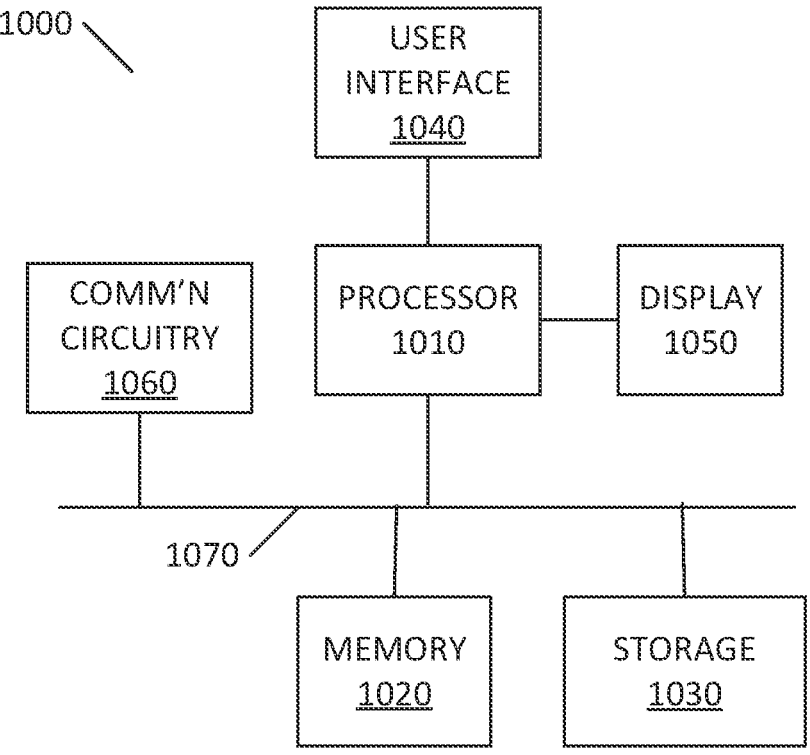
FIG. 10 shows, in block diagram form, a simplified multifunctional electronic device according to one or more embodiments.

Referring now to FIG. 10, a simplified functional block diagram of illustrative multifunctional electronic device 1000 is shown according to one embodiment. Multifunction electronic device 1000 may include processor 1010, memory 1020, storage device 1030, user interface 1040, display 1050, communications circuitry 1060, and communications bus 1070. Multifunction electronic device 1000 may be, for example, a personal electronic device such as a personal digital assistant (PDA), mobile telephone, or a tablet computer.

Processor 1010 may execute instructions necessary to carry out or control the operation of many functions performed by device 1000 (e.g., such as the generation of the simulated attack scenario as disclosed herein). Processor 1010 may, for instance, drive display 1050 and receive user input from user interface 1040. User interface 1040 may allow a user to interact with device 1000. For example, user interface 1040 can take a variety of forms, such as a button, keypad, dial, a click wheel, keyboard, display screen and/or a touch screen. Processor 1010 may also, for example, be a system-on-chip such as those found in mobile devices and include a dedicated graphics processing unit (GPU). Processor 1010 may be based on reduced instruction-set computer (RISC) or complex instruction-set computer (CISC) architectures or any other suitable architecture and may include one or more processing cores.

Memory 1020 may include one or more different types of media used by processor 1010 to perform device functions. For example, memory 1020 may include memory cache, read-only memory (ROM), and/or random access memory (RAM). Storage 1030 may store media (e.g., audio, image and video files), computer program instructions or software, preference information, device profile information, and any other suitable data. Storage 1030 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1020 and storage 1030 may be used to tangibly retain computer program instructions or code organized into one or more modules and written in any desired computer programming language. When executed by, for example, processor 1010 such computer program code may implement one or more of the methods described herein.

Figure 11:
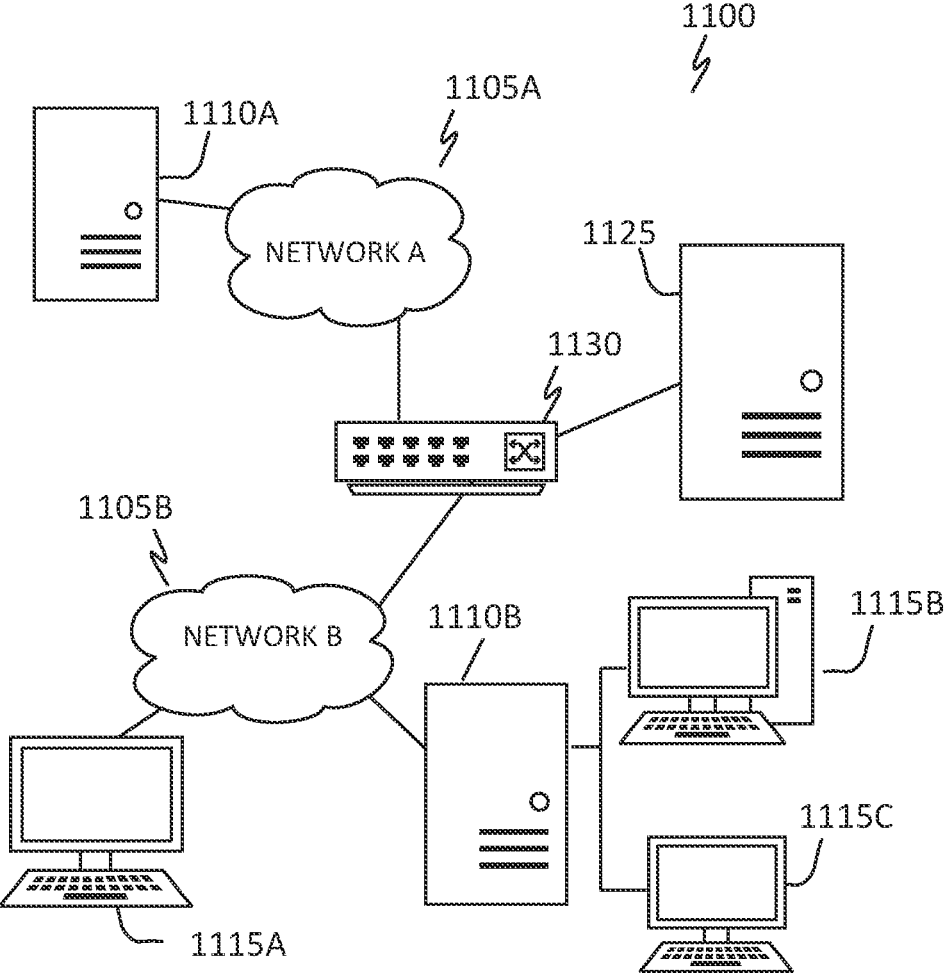
FIG. 11 shows, in block diagram form, a network diagram of a risk assessment and management system, according to one or more embodiments.

Referring to FIG. 11, illustrative network architecture 1100 within which a risk assessment and management system in accordance with the disclosed techniques may be implemented includes a plurality of networks 1105, (i.e., 1105A and 1105B), each of which may take any form including, but not limited to, a local area network (LAN) or a wide area network (WAN) such as the Internet. Further, networks 1105 may use any desired technology (wired, wireless or a combination thereof) and communication protocol (e.g., TCP, or transmission control protocol and PPP, or point to point). Coupled to networks 1105 are data server computer systems 1110 (i.e., 1110A and 1110B) that are capable of executing server applications such as database management applications and, further, are configured to communicate over networks 1105. One embodiment using server computers 1110 may involve the operation of one or more central systems to perform a plurality of Monte Carlo simulations and distribute the results and any indications of wildcards to nodes on a network. Also coupled to networks 1105, and/or data server computer systems 1110, are client or end-user computer systems 1115 (i.e., 1115A, 1115B and 1115C).

Client or end-user computer systems 1115 may take the form of any computational device including, but not limited to, electronic device 1000 shown in FIG. 10, smartphones, gaming systems, tablet computer systems, desktop or notebook computer systems, set-top box systems, entertainment devices or systems, televisions, virtual-reality or intelligent machines including embedded systems. In some embodiments, network architecture 1100 may also include network printers and network storage systems such as 1125. To facilitate communication between different network devices (e.g., server computer systems 1110, client computer systems 1115, network printers and storage system 1125). Storage system 1125 could, for example, be used to store multi-media items or links to other input, output, or intermediate processing-, storage-, backup- or recovery-related data referenced herein. Data includes application software, configuration, and licensing; application instance and configuration information; analyst configuration and preferences; user, client, and project information, libraries and templates; computational models and ratings; archival storage and backup/recovery information; system resiliency and redundancy information; storage and networking sources and data whether standalone, local, remote, or cloud networked; and metadata and meta-metadata about the aforementioned information.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:

receive a request comprising undesired event data defining an undesired event, wherein the undesired event data corresponds to an asset;

identify, from an attack database, one or more sets of attack attributes related to the undesired event data;

determine that intent is a driver among the attack attributes;

identify one or more protection measures relevant to the asset and the attack attributes;

in response to determining that intent is the driver:

perform a first set of Monte Carlo simulations, based on a Bayesian uncertainty model, for the undesired event based on a plurality of combinations of the attack attributes, the protection measures, and the asset;

perform a second set of Monte Carlo simulations, based on the Bayesian uncertainty model, for the undesired event based on a subset of the plurality of combinations of the attack attributes, wherein the second set of Monte Carlo simulations comprises a subset of the first set of Monte Carlo simulations comprising one or more variables of uncertainty among the one or more sets of attack attributes, and wherein the first set of Monte Carlo simulations include at least one simulation that is not included in the second set of Monte Carlo simulations, and the one or more variables of uncertainty are based at least in part on data associated with an attacker's reaction or adaptation to a variation in attack conditions and the one or more protection measures; and providing one or more combinations of the attack attributes, the protection measures, and the asset which result in the undesired event in accordance with outcomes of the first set of Monte Carlo simulations and the second set of Monte Carlo simulations.

2. The non-transitory computer readable medium of claim 1, wherein the one or more sets of attack attributes comprise at least one selected from a group consisting of: an attack type and an attacker type.

3. The non-transitory computer readable medium of claim 2 wherein the attack type comprises an attack vector.

4. The non-transitory computer readable medium of claim 2, wherein the attacker type comprises at least one selected from a group consisting of a goal, a harm method affinity, a motivation, one or more resources, and one or more capabilities.

5. The non-transitory computer readable medium of claim 1, further comprising computer readable code to: in response to determining that intent is not a driver among the attack attributes, perform one or more simulations based on a Brunswik Lens model.

6. The non-transitory computer readable medium of claim 1, wherein the computer readable code to perform the first set of Monte Carlo simulations comprises computer readable code to: obtain a plurality of actions for a particular Monte Carlo simulation; for each action in the plurality of actions: determine whether the action is time-based; in response to a determination that the action is time-based: determine whether the action is detectable; in response to a determination that the action is detectable, determine a simulation step for the action is a time increment; and in response to a determination that the action is undetectable, determine the simulation step is a state-based step.

7. The non-transitory computer readable medium of claim 6, further comprising computer readable code to, in response to a determination that the action is not time-based: determine, based on the protection measures, whether a change in a context influences completion of the action; in response to a determination that the change in the context influences completion of the action, determine the simulation step is a time increment; and in response to a determination that the change in the context does not influence completion of the action, determine the simulation step is a state-based step.

8. A system comprising: at least one server computers comprising one or more processors; and one or more computer readable media comprising computer readable code executable by one or more processors to:

receive a request comprising undesired event data defining an undesired event, wherein the undesired event data corresponds to an asset; identify, from an attack database, one or more sets of attack attributes related to the undesired event data;

determine that intent is a driver among the attack attributes;

identify one or more protection measures relevant to the asset and the attack attributes;

in response to determining that intent is the driver:

perform a first set of Monte Carlo simulations, based on a Bayesian uncertainty model, for the undesired event based on a plurality of combinations of the attack attributes, the protection measures, and the asset;

perform a second set of Monte Carlo simulations, based on a Bayesian uncertainty model, for the undesired event based on a subset of the plurality of combinations of the attack attributes, wherein the second set of Monte Carlo simulations comprises a subset of the first set of Monte Carlo simulations comprising one or more variables of uncertainty among the one or more sets of attack attributes, and wherein the first set of Monte Carlo simulations include at least one simulation that is not included in the second set of Monte Carlo simulations, and the one or more variables of uncertainty are based at least in part on data associated with an attacker's reaction or adaptation to a variation in attack conditions and the one or more protection measures; and providing one or more combinations of the attack attributes, the protection measures, and the asset which result in the undesired event in accordance with outcomes of the first set of Monte Carlo simulations and the second set of Monte Carlo simulations.

9. The system of claim 8, wherein the one or more sets of attack attributes comprise at least one selected from a group consisting of: an attack type and an attacker type.

10. The system of claim 9, wherein the attack type comprises an attack vector.

11. The system of claim 9, wherein the attacker type comprises at least one selected from a group consisting of a goal, a harm method affinity, a motivation, one or more resources, and one or more capabilities.

12. The system of claim 8, further comprising computer readable code to: in response to determining that intent is not a driver among the attack attributes, perform one or more simulations based on a Brunswik Lens model.

13. The system of claim 8, wherein the computer readable code to perform the first set of Monte Carlo simulations comprises computer readable code to: obtain a plurality of actions for a particular Monte Carlo simulation; for each action in the plurality of actions: determine whether the action is time-based; in response to a determination that the action is time-based: determine whether the action is detectable; in response to a determination that the action is detectable, determine a simulation step for the action is a time increment; and in response to a determination that the action is undetectable, determine the simulation step is a state-based step.

14. The system of claim 13, further comprising computer readable code to, in response to a determination that the action is not time-based: determine, based on the protection measures, whether a change in a context influences completion of the action; in response to a determination that the change in the context influences completion of the action, determine the simulation step is a time increment; and in response to a determination that the change in the context does not influence completion of the action, determine the simulation step is a state-based step.

15. A method comprising:

receiving a request comprising undesired event data defining an undesired event, wherein the undesired event data corresponds to an asset;

identifying, from an attack database, one or more sets of attack attributes related to the undesired event data;

determining whether intent is a driver among the attack attributes;

identifying one or more protection measures relevant to the asset and the attack attributes;

in response to determining that intent is the driver:

performing a first set of Monte Carlo simulations, based on a Bayesian uncertainty model, for the undesired event based on a plurality of combinations of the attack attributes, the protection measures, and the asset;

performing a second set of Monte Carlo simulations, based on the Bayesian uncertainty model, for the undesired event based on a subset of the plurality of combinations of the attack attributes, wherein the second set of Monte Carlo simulations comprises a subset of the first set of Monte Carlo simulations comprising one or more variables of uncertainty among the one or more sets of attack attributes, and wherein the first set of Monte Carlo simulations include at least one simulation that is not included in the second set of Monte Carlo simulations, and the one or more variables of uncertainty are based at least in part on data associated with an attacker's reaction or adaptation to a variation in attack conditions and the one or more protection measures; and providing one or more combinations of the attack attributes, the protection measures, and the asset which result in the undesired event in accordance with outcomes of the first set of Monte Carlo simulations and the second set of Monte Carlo simulations.

16. The method of claim 15, wherein the one or more sets of attack attributes comprise an attack vector.

17. The method of claim 15, further comprising: in response to determining that intent is not a driver among the attack attributes, performing one or more simulations based on a Brunswik Lens model.

* * * * *